(12) United States Patent
Yoon et al.

(10) Patent No.: US 7,844,421 B2
(45) Date of Patent: Nov. 30, 2010

(54) HYBRID FINITE ELEMENT METHOD FOR TRAVELING SURFACE ACOUSTIC WAVES WITH THICKNESS EFFECT

(75) Inventors: Sangpil Yoon, Campbell, CA (US); Jiun-Der Yu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 990 days.

(21) Appl. No.: 11/623,260

(22) Filed: Jan. 15, 2007

(65) Prior Publication Data

US 2008/0172210 A1 Jul. 17, 2008

(51) Int. Cl.
*G06F 7/60* (2006.01)
(52) U.S. Cl. .................................... 703/2; 703/1; 703/6
(58) Field of Classification Search ...................... 703/1, 703/2, 6
See application file for complete search history.

(56) References Cited

U.S. PATENT DOCUMENTS

| | | | |
|---|---|---|---|
| 5,604,891 A | 2/1997 | Burnett et al. | |
| 5,604,893 A | 2/1997 | Burnett et al. | |
| 5,963,459 A | 10/1999 | Burnett et al. | |
| 6,301,192 B1 | 10/2001 | Reise | |
| 6,687,659 B1 | 2/2004 | Shen | |
| 2002/0035456 A1 | 3/2002 | Cremers et al. | |
| 2005/0275696 A1 | 12/2005 | Miyazawa et al. | |
| 2006/0149513 A1 | 7/2006 | Yoon | |

OTHER PUBLICATIONS

G.W. Farnell, "Physical Acoustics", Principles and Methods, "Properties of Elastic Surface Waves" 1970, 6:109-166, Academic Press, New York, N.Y.

M. Koshiba et al., "Finite Element Solution of Periodic Waveguides for Acoustic Waves", IEEE Transactions on Ultrasonics, Ferroelectrics and Frequency Control, 1987, 34(4):472-477, IEEE New York, N.Y.

Koji Hasegawa et al., "Hybrid Finite Element Analysis of Leaky Surface Acoustic Waves in Periodic Waveguides", Japanese Journal of Applied Physics, Part 1, No. 5B, 1996, 35:2997-3001, The Institute of Pure and Applied Physics, Tokyo, Japan.

V. Lacroix et al., "An iterative Defect-Correction Type Meshless Method for Acoustics", International Journal for Numerical Methods in Engineering, 2003, pp. 2131-2146.

S. Li et al., "Meshfree and Particle Methods and Their Applications", Appl. Mech. Rev., vol. 55, No. 1, Jan. 2002, pp. 1-34.

S. Suleau, et al. "One-Dimensional Dispersion Analysis for the Element-Free Galerkin Method for the Helmholtz Equation", International Journal for Numerical Methods in Engineering, Int. J. Numer. Meth. Engng. 2000; pp. 1169-1188.

(Continued)

*Primary Examiner*—Jason Proctor

(57) ABSTRACT

The present invention is a process for simulating a SAW device, while taking into account the thickness of the substrate. An aspect of the present invention is simulating a traveling surface acoustic wave in a periodic waveguide. The surface acoustic wave is simulated by analyzing an upper portion of the waveguide including a periodic array of electrodes using a periodic finite element method. The simulation further involves analyzing a lower portion of the waveguide including a bottom of the waveguide with an analytic method.

8 Claims, 3 Drawing Sheets

OTHER PUBLICATIONS

J. Jung, et al., "Vibration Mode Analysis Bulk Acoustic Wave Resonator Using Finite Element Method", 2001 IEEE Ultrasonics Symposium, pp. 847-850.

J. Hoffelner, et al., "Calculation of Acoustic Streaming Velocity and Radiation Force Based on Finite Element Simulations of Nonlinear Wave Propagation", 2000 IEEE Ultrasonics Symposium, 2000, pp. 585-588.

J. Stewart, et al., "Finite Element Modeling of the Effects of Mounting Stresses on the Frequency Temperature Behavior of Surface Acoustic Wave Devices", 1997 IEEE Ultrasonics Symposium, pp. 105-111.

J. S. Chen, et al., "Large Deformation Analysis of Rubber Based on a reproducing Kernel Particle Method", Computational Mechanics 19, 1997, pp. 211-227.

J. S. Chen, et al., "Reproducing Kernel Particle Methods for Large Deformation Analysis of Non-Linear Structures", Computer Methods in Applied Mechanics and Engineering, 139, 1996, pp. 195-227.

W. K. Liu, et al., "Reproducing Kernel Particle Methods for Structural Dynamics", International Journal for Numerical Methods in Engineering, vol. 38, 1995, pp. 1655-1679.

H. P. Reichinger et al., Dynamic 2D Analysis of SAW-Devices Including Massloading, 1992 Ultrasonics Symposium Proceedings, 1:7-10, 1992, IEEE, New York, NY.

Ventura, P., et al., "A Mixed FEM/Analytical Model of the Electrode Mechanical Perturbation for SAW and PSAW Propagation", 1993 Ultrasonics Symposium Proceedings, pp. 205-208, IEEE.

Endoh, G., et al., "Surface Acoustic Wave Propagation Characterisation by Finite-Element Method and Spectral Domain Analysis", Japanese Journal of Applied Physics, vol. 34, pp. 2638-2641, Part 1, No. 5B, May 1995.

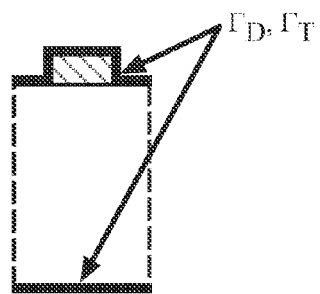

FIG. 2C

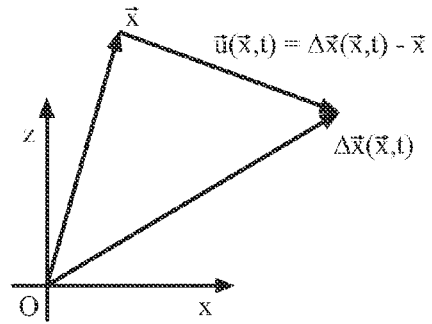

| Analyze an upper portion of a periodic waveguide using a finite element method | 402 |

↓

| Analyze a lower portion of a periodic waveguide using an analytic method | 404 |

| Transform eight roots of the Christoffel equation into two sets of four roots | 406 |

↓

| Calculate four roots of the Christoffel equation whose imaginary part is less than zero, for the first set | 408 |

↓

| forming the second set of roots based on a relationship between the first set and the second set. | 410 |

FIG. 4B

HYBRID FINITE ELEMENT METHOD FOR TRAVELING SURFACE ACOUSTIC WAVES WITH THICKNESS EFFECT

BACKGROUND OF THE INVENTION

1. Field of the Invention

This invention relates generally to the simulating and analysis of surface acoustic wave devices and, more particularly, to a method and a system of simulating a surface acoustic wave on a simulated structure.

2. Description of the Related Art

A Surface Acoustic Wave (SAW) is a standing or traveling acoustic wave on the surface of a substrate. A typical SAW device includes a substrate (typically made from a piezoelectric material) and a periodic array of electrodes on the surface of the substrate. Piezoelectric materials deform in response to a voltage being applied to them. Piezoelectric materials also generate a voltage in response to stress being applied to them.

A SAW device may be simulated by numerically solving governing equations which describe the behavior of the device. Examples of such governing equations are Newton's equation of motion and Gauss' equation of charge conservation. The material properties, geometry and driving voltages are very important to simulating the behavior of the SAW device.

One method of simulating a SAW device is to use the Finite Element (FE) method to solve the governing equations. The FE method involves creating a mesh, in which a problem domain is divided into a set of discrete sub-domains called elements. The governing equations, which describe the behavior of each element, are then solved for each element. The governing equations are typically solved numerically. The size of the mesh will determine the amount of computational time required to simulate the SAW device. The mesh elements should be small enough to effectively simulate the behavior of the SAW device, but not so small as to require an unreasonable amount of computational resources.

The typical SAW device includes a thin electrode and a relatively thick substrate. As the frequency of the waves being simulated becomes higher, the coupling of the SAW and the bulk acoustic wave (BAW) becomes so intense that distinguishing the SAW from the BAW becomes an issue.

An additional method of simulating a SAW device is to use a hybrid FE (HFE) method. A typical HFE method when used to simulate a SAW device would use the FE method in a region of the electrodes including a portion of the substrate and an analytic method for the remaining region of the SAW devices substrate. Examples of analytic methods that have been used include: a Periodic Green's Function, a Boundary Element Method (BEM) or a Spectral Domain Method (SDM). In the past these approaches have assumed a semi-infinite substrate. Thus, the thickness of the SAW device is not fully taken into account using these methods.

An example of such a HFE method was described by Koji HASEGAWA et al., in Hybrid Finite Element Analysis of Leaky Surface Acoustic Waves in Periodic Waveguides, Japanese Journal of Applied Physics, Part 1, 35(5B): 2997-3001, 1996, The Japan Society of Applied Physics, Tokyo, JAPAN (hereinafter Hasegawa).

Hasegawa describes a method in which an inhomogeneous region including the electrodes is analyzed by the FE method and the substrate region, which is assumed to be semi-infinite, is approximated by an expansion of space harmonics. Only partial roots of Christoffel equations for each space harmonics are used for the basis of the expansion.

However, if Hasegawa is modified such that the substrate is assumed to be finite and all the roots of the Christoffel equations are used, floating-point overflow issues arise. So the numerical solution is limited to cases in which the substrate thickness is less than a few (i.e., three) wavelengths or infinite.

These limitations in Hasegawa and methods of this type leave a large swath of problems for which finding a numerical solution is difficult. For example these methods do not take into account the thickness of the substrate or the effect of reflections from the bottom of the substrate.

In view of the shortcoming described above there is a need for systems and methods to address the shortcomings of the above methods while maintaining high accuracy and low computational costs.

OBJECTS OF THE INVENTION

An object of the present invention is to accurately simulate a SAW device without requiring an unreasonable amount of computational resources.

SUMMARY OF THE INVENTION

The present invention is a process for simulating a SAW device, while taking into account the thickness of the substrate. An aspect of the present invention is simulating a surface acoustic wave in a periodic waveguide. The surface acoustic wave is simulated by analyzing an upper portion of the waveguide including a periodic array of electrodes using a periodic finite element method. The simulation further involves analyzing a lower portion of the waveguide including a bottom of the waveguide with an analytic method.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 2C is a cross-sectional view of one period of a periodic SAW device, showing external Boundary conditions;

FIG. 3 is an illustration of a displacement vector; and

FIGS. 4A-B are illustrations of a method embodying the present invention; and

DESCRIPTION OF THE PREFERRED EMBODIMENTS

I. Introduction

Figure 1A:
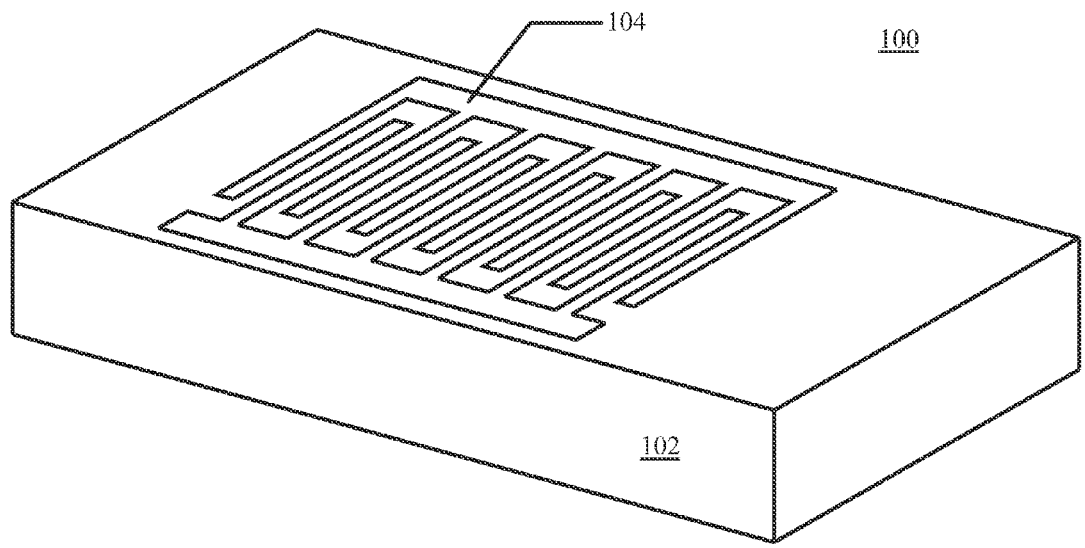
FIG. 1A is of a perspective view of a SAW device.
Figure 1B:
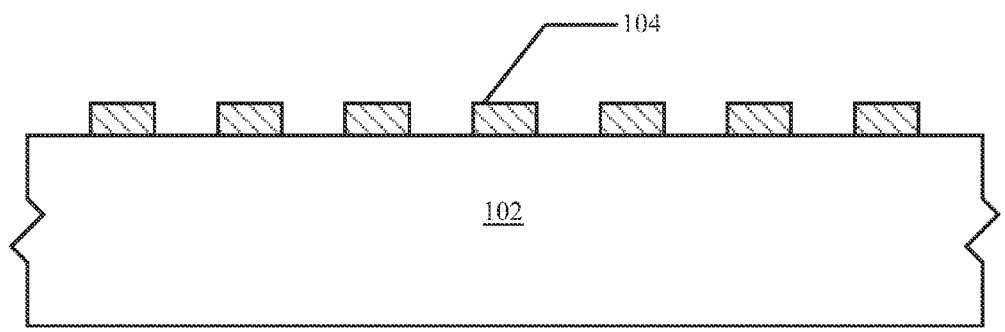
FIG. 1B is a cross-sectional view of a periodic SAW device.

FIG. 1A is a perspective view of a typical SAW device 100. The SAW device 100 includes a substrate 102 and a periodic array of electrodes 104 on the surface of the substrate. FIG. 1B is a cross-sectional view of the SAW device 100 showing the substrate 102 and the periodic array of electrodes 104.

Figure 2A:
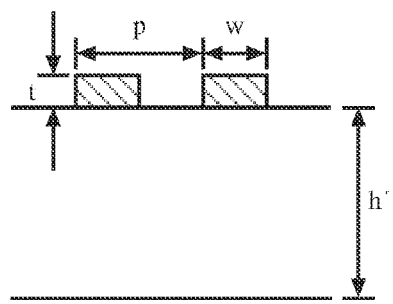
FIG. 2A is a cross-sectional view of a periodic SAW device showing the dimensions.

FIG. 2A is cross-sectional view of a portion of the SAW device, with the relevant dimensions indicated. The period of the electrodes 104 is p. The width of an electrode 104 is w. The thickness of the electrode 104 is t. The thickness of the substrate 102 is h'.

Figure 2B:
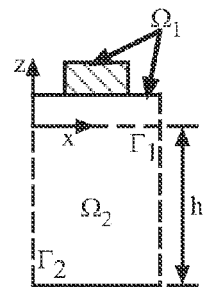
FIG. 2B is a cross-sectional view of one period of a periodic SAW device, showing two simulation regions.

FIG. 2B is a cross-sectional view of a single period of electrodes 104 on the SAW device 100. The simulation may be limited to this single period or to multiple periods. The simulation may be divided into two regions, an inhomogeneous region $\Omega_1$, and a homogeneous region $\Omega_2$, by an interface boundary $\Gamma_1$. The inhomogeneous region $\Omega_1$ consists of an electrode and a region immediately beneath it. The homogeneous region $\Omega_2$ consists of the region immediately below $\Omega_1$ extending from $\Gamma_1$ to the bottom of the substrate represented by $\Gamma_2$.

Consider the region $\Omega_1$ including the electrodes as shown in FIG. 2B. As noted above, the region $\Omega_1$, is divided up into a plurality of elements. Each element is defined by a plurality of nodes, located at the corner of each element. In the case of two dimensional rectangular elements each element has four nodes. In the case of three dimensional rectilinear elements each element has eight nodes. It would obvious to someone skilled in the art that alternative element shapes are possible.

II. Governing Equations.

Simulation of the SAW device 100 may involve the simulation of time-varying deformation, i.e. vibration, of the material of the SAW device 100. The SAW device 100 is composed of atoms. The vibration of these atoms may form the basis of the SAW devices 100 behavior. Nonetheless, it is often simpler to ignore this fact and simulate the SAW device on the macroscopic level as a continuum using continuum mechanics.

Governing equations which describe the behavior of the SAW device 100 in terms of a displacement field $\vec{u}(\vec{x},t) = \vec{x} - \Delta\vec{x}(\vec{x},t)$ as illustrated in FIG. 3. The vector $\vec{x}$ may be a position vector which describes points in the simulation space relative to an origin O. The vector $\Delta\vec{x}$ describes positions to which points in the simulation space have been displaced.

A simulation of the SAW device 100 may be based on one or more governing equations. Examples of such governing equations are Newton's equation of motion and Gauss' equation of charge conservation.

$$\sum_{i}^{x,y,z} \frac{\partial T_{ij}}{\partial x_i} = \rho \frac{\partial^2 u_j}{\partial t^2} = -\rho \omega^2 u_j \tag{1}$$

$$\sum_{i}^{x,y,z} \frac{\partial D_i}{\partial x_i} = 0$$

$$i, j = x, y, z$$

Equations (2) are an adaptation of Newton's equation of motion to the situation of an acoustic wave traveling through a substrate and Gauss' equation of charge conservation. The indices i and j may take on the dimensions x, y and z. $\omega$ is representative of the frequency of acoustic waves in the SAW device, T is a stress tensor of order two representative of stress in the SAW device 100, and $\rho$ is the mass density of the SAW device 100.

$$T_{ij} = \sum_{k,l} (c_{ijkl} S_{kl} - e_{kij} E_k) \tag{2}$$

$$D_i = \sum_{j,k} (e_{ijk} S_{jk} + \varepsilon_{ij} E_j)$$

$$i, j, k, l = x, y, z$$

Equations (2) are exemplary constitutive relations of elements of the stress tensor T and the electric displacement vector $\vec{D}$. Wherein: c is the elastic constant tensor; e is the piezoelectric constant tensor; $\in$ is the dielectric permittivity at constant strain tensor; S is the strain tensor and $\vec{E}$ is the electric field. The strain tensor S and the electric field $\vec{E}$ are related to the particle displacement field $\vec{u}$, and the electric potential $\phi$, by equations (3), below.

$$S_{ij} = \frac{1}{2}\left(\frac{\partial u_i}{\partial x_j} + \frac{\partial u_j}{\partial x_i}\right) \tag{3}$$

$$E_i = -\frac{\partial \phi}{\partial x_i}$$

$$i, j = x, y, z$$

The invention is a method that takes the substrate thickness into account by considering: all the roots of Christoffel equations for each space harmonics used for the basis of the expansion thus counting reflection effects due to the finite thickness of the substrate and conversion of bulk acoustic waves into surface acoustic waves and the physical existence of the bottom of the substrate.

2.2 Hybrid Variational Formulation.

The problem may be reduced from three dimensions as shown in FIG. 1A to two dimensions as shown in FIG. 1B by assuming that there is no variation in the y direction parallel to the axis of the electrodes. The problem may be further reduced by assuming periodic boundary conditions in the x direction. The solution space may consist of one period of the SAW device. An individual skilled in the art would be able to construct periodic boundary conditions based upon methods well known in the art.

The present invention is an improvement upon the method disclosed in Hasegawa which made use of a hybrid variational method. Solutions using the hybrid variational method may make use of the following functionals: $L_1$ for the inhomogeneous region $\Omega_1$; and $L_2$ for the homogeneous region $\Omega_2$.

$$L_1 = \frac{1}{2}\int_{\Omega_1}(S_{ij}T_{ij}^* - \omega^2 \rho u_i u_i^* - E_i D_j^*)d\Omega - \tag{4}$$

$$\int_{\Gamma_T} u_1 T_{ij}^* n_j d\Gamma - \int_{\Gamma_D} \phi \overline{D_i^*} n_i d\Gamma + c.c$$

-continued $$L_2 = -\frac{1}{2}\int_{\Gamma_1}(u_i T_{ij}^* - \phi D_j^*)d\Gamma + \qquad (5)$$
$$\int_{\Gamma_1}(\tilde{u}_i T_{ij}^* + \tilde{\phi}D_j^*)d\Gamma \ldots - \int_{\Gamma_T}\tilde{u}_i \overline{T}_{ij}^* d\Gamma - \int_{\Gamma_D}\tilde{\phi}\overline{D}_j^* d\Gamma + c.c$$

In the above equations: the superscript "*" denotes the complex conjugate; the superscript "-" denotes specified values imposed by the boundary conditions; the term c.c. represents the complex conjugate for other terms on the right-hand side of equations. Equations (4) and (5) include integrals over the surfaces $\Gamma_T$ and $\Gamma_D$ which are the external boundary conditions as shown in FIG. 2C. The tensor $\overline{T}$ is the external stress tensor and vector $\overline{D}$ is the external electric displacement. In particular, the traction free boundary condition will be assumed meaning that the stress tensor at the top and bottom of the device is zero.

The region $\Omega_1$, including the electrodes, is divided up into a plurality of conventional finite elements using known meshing methods. For the region $\Omega_2$, the Lagrangian variables are $\tilde{u}$ (the displacement) and $\tilde{\phi}$ (the electric potential) on the interface, $\Gamma_1$. The interface $\Gamma_1$ is expanded with finite element shape functions as follows:

$$[\tilde{u}_x \ \tilde{u}_y \ \tilde{u}_z \ \tilde{\phi}]^T = [N]\{\tilde{U}\} \qquad (6)$$

with $$[N]^T = \begin{bmatrix} \{N\} & & & \\ & \{N\} & & \\ & & \{N\} & \\ & & & \{N\} \end{bmatrix} \qquad (7)$$

$$\{\tilde{U}\}^T = \begin{bmatrix} \{\tilde{u}_x\}^T & \{\tilde{u}_y\}^T & \{\tilde{u}_z\}^T & \{\tilde{\phi}\}^T \end{bmatrix}^T$$

The vectors $\{\tilde{u}_i\}$ and $\{\tilde{\phi}\}$ are the displacements and the electrostatic potential at the interface $\Gamma_1$. The vector $\{\tilde{U}\}$ is the solution vector. The vector $\{N\}$ is the shape function vector.

In the substrate, field distributions may be approximated by a superposition of a space harmonics, thus:

$$\{u\} = [F]_{4\times(2M\times 8)}\{A\}_{(2M\times 8)\times 1} \qquad (8)$$

$$\begin{Bmatrix} u_x \\ u_y \\ u_z \\ \phi \end{Bmatrix} = \sum_{n=-M-1}^{M}\sum_{l=1}^{8} A_{nl}\begin{Bmatrix} f_{x,nl} \\ f_{y,nl} \\ f_{z,nl} \\ f_{\varphi,nl} \end{Bmatrix}\exp[j(\beta_n x + k_{nl}z - wt)]$$

where $A_{nl}$ is a coefficient of the $l^{th}$ partial wave corresponding to the $n^{th}$ space harmonics; $k_{nl}$ is the wave number of the partial wave; $f_{i,nl}$ (i=x,y,z,$\phi$) is the mode function of the partial waves; and $\beta_n = \beta_0 + 2n\pi/p$ with $\beta_0$ being the complex wave number. Both $k_{nl}$ and $f_{i,nl}$ may be obtained by solving Christoffel equations for each space harmonic. $\{A\}$ is a vector with 2M times 8 elements and [F] is a matrix with 4 times 2M times 8 elements.

Substituting equation (8) into equation (3) and using equation (2) we obtain equation (9).

$$\begin{Bmatrix} T_{xz} \\ T_{yz} \\ T_{zz} \\ D_z \end{Bmatrix} = \sum_{n=-M-1}^{M}\sum_{l=1}^{8} A_{nl}\begin{Bmatrix} q_{x,nl} \\ q_{y,nl} \\ q_{z,nl} \\ q_{D,nl} \end{Bmatrix}\exp[j(\beta_n x + k_{nl}z - wt)] = \qquad (9)$$

$$[Q]_{4\times(2M\times 8)}\{A\}_{(2M\times 8)\times 1}$$

where $$q_{x,nl} = \{c_{15}f_{x,nl}(j\beta_n) + c_{55}f_{x,nl}(jk_n)\} + \qquad (10)$$
$$\{c_{56}f_{y,nl}(j\beta_n) + c_{45}f_{y,nl}(jk_n)\}\{c_{55}f_{z,nl}(j\beta_n) + c_{53}f_{z,nl}(jk_n)\} +$$
$$\{e_{15}f_{D,nl}(j\beta_n) + e_{35}f_{D,nl}(jk_n)\}$$
$$q_{y,nl} = \{c_{14}f_{x,nl}(j\beta_n) + c_{45}f_{x,nl}(jk_n)\} +$$
$$\{c_{46}f_{y,nl}(j\beta_n) + c_{44}f_{y,nl}(jk_n)\}\{c_{45}f_{z,nl}(j\beta_n) + c_{34}f_{z,nl}(jk_n)\} +$$
$$\{e_{14}f_{D,nl}(j\beta_n) + e_{34}f_{D,nl}(jk_n)\}$$
$$q_{z,nl} = \{c_{13}f_{x,nl}(j\beta_n) + c_{35}f_{x,nl}(jk_n)\} +$$
$$\{c_{36}f_{y,nl}(j\beta_n) + c_{34}f_{y,nl}(jk_n)\}\{c_{35}f_{z,nl}(j\beta_n) + c_{33}f_{z,nl}(jk_n)\} +$$
$$\{e_{13}f_{D,nl}(j\beta_n) + e_{33}f_{D,nl}(jk_n)\}$$
$$q_{D,nl} = \{e_{31}f_{x,nl}(j\beta_n) + e_{35}f_{x,nl}(jk_n)\} +$$
$$\{e_{36}f_{y,nl}(j\beta_n) + e_{34}f_{y,nl}(jk_n)\}\{e_{35}f_{z,nl}(j\beta_n) + e_{33}f_{z,nl}(jk_n)\} +$$
$$\{\varepsilon_{31}f_{D,nl}(j\beta_n) + \varepsilon_{33}f_{D,nl}(jk_n)\}$$

2.3 Adaptive Wave Component Amplitude Allocation

All the roots of the Christoffel equation are used in these expansions, thus taking the effects of the substrate and the reflected waves from the bottom of the substrate into account. The roots of the Christoffel equation refer to solutions of the Christoffel equation. This should be distinguished from Hasegawa in which only 4 roots of the Christoffel equations are used. In addition, the traction-free condition is enforced at the interface $\Gamma_2$ for each of the space harmonics at z=−h as stated in equation (11) below which can be deduced from equation (9) above.

$$0 = \begin{Bmatrix} T_{xz} \\ T_{yz} \\ T_{zz} \\ D_z \end{Bmatrix} = \exp[j(\beta_n x - wt)]\sum_{l=1}^{8} A_{nl}\begin{Bmatrix} q_{x,nl} \\ q_{y,nl} \\ q_{z,nl} \\ q_{D,nl} \end{Bmatrix}\exp[j(k_{nl}z)]_{z=-h} = \qquad (11)$$

$$[Q]_{z=-h}\{A\}_{(2M\times 8)\times 1}$$

The following steps may be used to insure that all 8 space harmonics can satisfy the traction-free boundary condition at z=−h. The matrix [Q] may be divided into two parts depending on the signs of the imaginary part of the complex wave number, $\text{Im}(k_{nl})$, as shown in equation (12).

$$k_{nl} = \begin{cases} k_{nl}^- & l = 1 \sim s & \text{for Im}(k_{nl}) < 0 \\ \alpha_{nl} + j\xi_{nl} & l = (s+1) \sim 8 & \text{for Im}(k_{nl}) > 0 \end{cases} \qquad (12)$$

The integer s is the number of wave numbers $k_{nl}$ which have a negative imaginary part. A new variable $k_{nl}^-$ represents $k_{nl}$ when $\text{Im}(k_{nl}) < 0$, a variable $\alpha_{nl}$ represents the real part of $k_{nl}$ when $\text{Im}(k_{nl}) > 0$ and a variable $\xi_{nl}$ is the imaginary part of $k_{nl}$ when $\text{Im}(k_{nl}) > 0$. Incorporating equation (12) into equation (11) produces equation (13), below.

$$0 = \sum_{l=1}^{S} A_{nl} \begin{pmatrix} q_{x,nl} \\ q_{y,nl} \\ q_{z,nl} \\ q_{D,nl} \end{pmatrix} \exp[j(k_{nl}^{-})(-h)] + \quad (13)$$

$$\sum_{l=s+1}^{8} A_{nl} \begin{pmatrix} q_{x,nl} \\ q_{y,nl} \\ q_{z,nl} \\ q_{D,nl} \end{pmatrix} \exp[j(\alpha_{nl} + j\xi_{nl})(-h)] =$$

$$\sum_{l=1}^{S} A_{nl} \begin{pmatrix} q_{x,nl} \\ q_{y,nl} \\ q_{z,nl} \\ q_{D,nl} \end{pmatrix} \exp[-j(k_{nl}^{-})h] +$$

$$\sum_{l=s+1}^{8} A_{nl} \begin{pmatrix} q_{x,nl} \\ q_{y,nl} \\ q_{z,nl} \\ q_{D,nl} \end{pmatrix} \exp[-j\alpha_{nl}h + \xi_{nl}h] =$$

$$\sum_{l=1}^{S} A_{nl} \begin{pmatrix} q_{x,nl} \\ q_{y,nl} \\ q_{z,nl} \\ q_{D,nl} \end{pmatrix} \exp[-j(k_{nl}^{-})h] +$$

$$\sum_{l=s+1}^{8} \bar{A}_{nl} \begin{pmatrix} q_{x,nl} \\ q_{y,nl} \\ q_{z,nl} \\ q_{D,nl} \end{pmatrix} \exp[-j\alpha_{nl}h] = [Q_1]_{z=-h}$$

$$\{A\} + [Q_2]_{z=-h}\{\bar{A}\}$$

The above formulations of equation (13) show how terms may be rearranged. A new variable $\bar{A}_{nl}$ is introduced in which $\bar{A}_{nl} = A_{nl}\exp(\xi_{nl}h)$. Equation (13) may be used to write $\{\bar{A}\}$ in terms of $\{A\}$ as shown in equation (14).

$$\{\bar{A}\} = -[Q_2]_{z=-h}^{-1}[Q_1]_{z=-h}\{A\} = [R]_{z=-h}\{A\} \quad (14)$$

It should be possible to find four roots, solutions, whose imaginary part is negative, that is, s=4. It can be easily shown that the term $\exp(\xi_{nl}h)$ causes numerical overflow when $\xi_{nl} \neq 0$ and the thickness h greater than one, h>1. Numerical overflow is thus avoided by replacing the evaluation of the exponential term $\exp(\xi_{nl}h)$ with evaluation of $[R]_{z=-h}$.

The methodology used above may also be applied to equation (8). Thus, yielding equation (15) below.

$$\begin{Bmatrix} u_x \\ u_y \\ u_z \\ \phi \end{Bmatrix} = [F]_{4 \times (2M \times 8)}\{A\}_{(2M \times 8) \times 1} = [F_1]\{A\} + [F_2]\{\bar{A}\} = \quad (15)$$

$$\langle [F_1] + [F_2][R]_{z=-h}\rangle\{A\}$$

From equation (4), the functional $L_1$ for region $\Omega_1$, the following matrix equation (16) can be obtained using standard methods. Wherein: matrix $[K_{FE}]$ is the finite element matrix; the vector $\{\tilde{u}_i\}$ is composed of the values of $\tilde{u}_i$ at the boundary $\Gamma_1$; the vector $\{\tilde{\phi}_i\}$ is composed of the values of $\tilde{\phi}_i$ at the boundary $\Gamma_1$; and the vector $\{u_0\}$ is composed of those values at nodes other than boundary $\Gamma_1$.

$$[K_{FE}] \begin{Bmatrix} \{u_0\} \\ \{\tilde{u}_x\} \\ \{\tilde{u}_y\} \\ \{\tilde{u}_z\} \\ \{\tilde{\phi}\} \end{Bmatrix} = \begin{Bmatrix} 0 \\ -\int_{\Gamma_1}\{N\}T_{xz}dx \\ -\int_{\Gamma_1}\{N\}T_{yz}dx \\ -\int_{\Gamma_1}\{N\}T_{LL}dx \\ -\int_{\Gamma_1}\{N\}D_z dx \end{Bmatrix} \quad (16)$$

From equation (5), the functional $L_2$ for region $\Omega_2$, matrix equation (17) can also be obtained using hybrid variational principles.

$$L_2 = -A^\dagger[H]\{A\} + A^\dagger[K]\{\tilde{u}_p\} + \tilde{u}_p^\dagger \lfloor K^\dagger \rfloor\{A\} \quad (17)$$

The matrices [H] and [K] used in equation (17) are defined below in equations (18).

$$[H] = \frac{1}{2}\int_{\Gamma_1}[F]^\dagger[Q]dx + \frac{1}{2}\int_{\Gamma_1}[Q]^\dagger[F]dx \quad (18)$$

$$[K] = \int_{\Gamma_1}[Q]^\dagger[N]dx$$

The superscript † is the adjoint operator and denotes a complex conjugate transpose. The matrices [F] and [Q] were previously defined in equations (8) and (9). The functional $L_2$ for region $\Omega_2$ as defined in equation (17) can be made stationary with respect to {A} producing equation (19).

$$[H]\{A\} = [K]\{\tilde{U}\} \quad (19)$$

Which also produces a solution for the vector {A}.

$$[K^T \; H^{-1} \; K] \begin{Bmatrix} \{\tilde{u}_x\} \\ \{\tilde{u}_y\} \\ \{\tilde{u}_z\} \\ \{\tilde{\phi}\} \end{Bmatrix} = \begin{Bmatrix} -\int_{\Gamma_1}\{N\}T_{xz}dx \\ -\int_{\Gamma_1}\{N\}T_{yz}dx \\ -\int_{\Gamma_1}\{N\}T_{LL}dx \\ -\int_{\Gamma_1}\{N\}D_z dx \end{Bmatrix} \quad (20)$$

Equations (16) and (20) can be used to generate a system of linear homogeneous equations. By adding equation (20) to equation (16) at the boundary we get the linear homogenous equation (21).

$$[K^T \; H^{-1} \; K + K_{FE}] \begin{Bmatrix} \{u_0\} \\ \{\tilde{u}_x\} \\ \{\tilde{u}_y\} \\ \{\tilde{u}_z\} \\ \{\tilde{\phi}\} \end{Bmatrix} = 0 \quad (21)$$

A nontrivial solution to equation (21) may be found by setting the determinant of equation (21) to zero. Which may then be used to determine the value of complex wave number β. Solutions may also be obtained by searching for the minimum of the absolute value of the determinant of the system.

4. Method

The invention described above may also be described in a method 400 illustrated in FIG. 4A. The goal of the method 400 is to describe the physical and electrical characteristics of a device. An exemplary device upon which the method 400 may be used is the periodic SAW device 100. The method 400 may involve a step 402 in which an upper portion of the device is analyzed using a Finite Element Method. An example of such an upper portion is $\Omega_1$ shown in FIG. 2B. The method 400 may also involve the step 402 in which a lower portion of the device is analyzed using an analytic method. An example of such a lower portion is $\Omega_2$ shown in FIG. 2B. The upper portion and the lower portion share an interface. An example of such an interface is $\Gamma_1$ shown in FIG. 2B.

The method 404 for analyzing the lower portion of the device is illustrated in FIG. 4B. The method 404 may involve a transformative step 406 in which a set consisting of eight solutions to the Christoffel equation is transformed into two sets. A calculation step 408 may consist of forming a first set of the two sets consisting of four solutions in which the imaginary part is less than zero and a second set. The second set may be found by forming a relationship between the first set and the second set and determining the second set from this relationship in step 410. The solutions to the Christoffel equation are representative of the behavior of the device.

4. System

Figure 5:
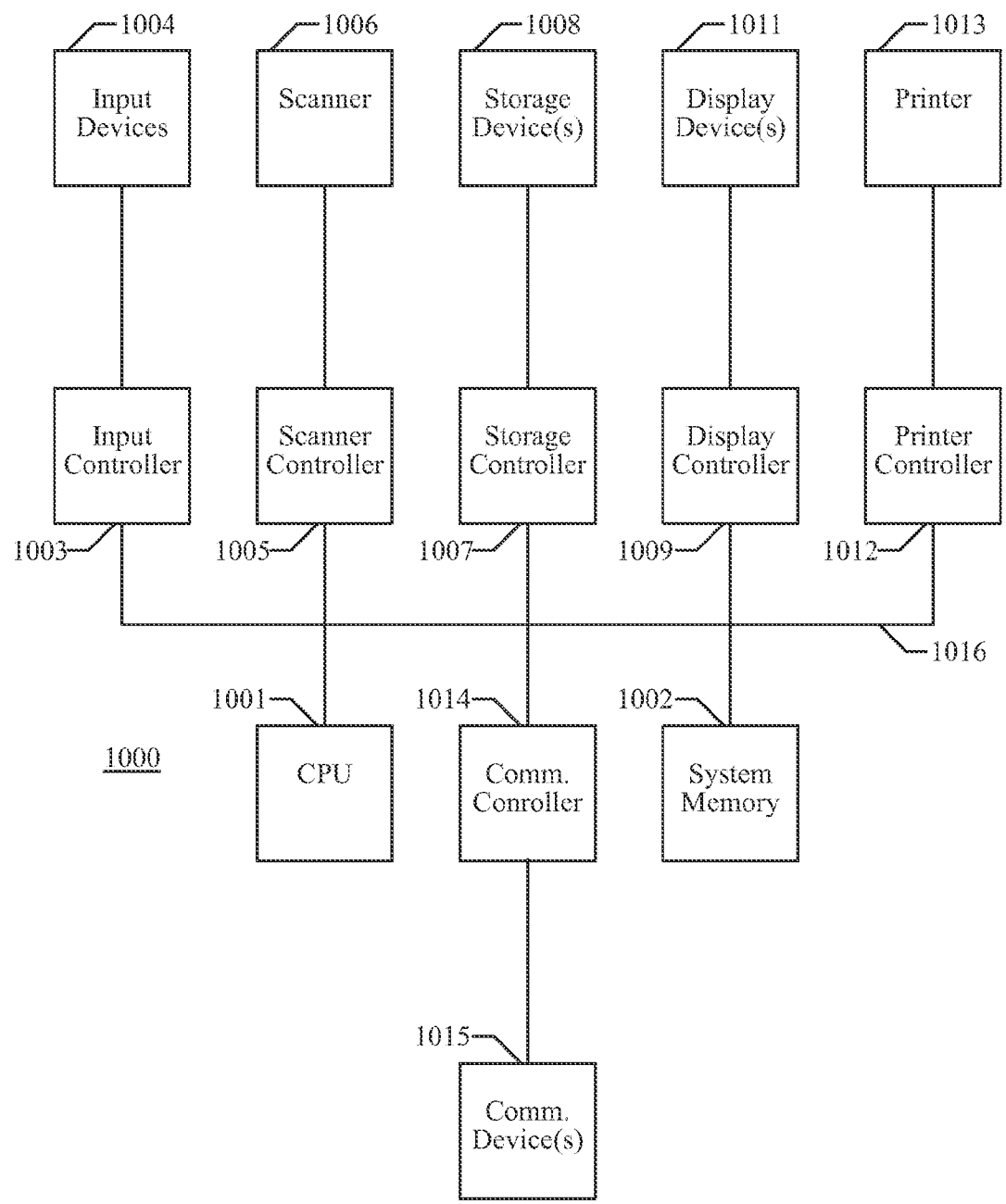
FIG. 5 is a block diagram illustrating an exemplary system which may be used to implement aspects of the present invention.

Having described the details of the invention, an exemplary system 1000 which may be used to implement one or more aspects of the present invention will now be described with reference to FIG. 5. As illustrated in FIG. 5, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002 which may be in the form of random-access memory (RAM) and read-only memory (ROM).

A number of controllers and peripheral devices may also be provided, as shown in FIG. 5. An input controller 1003 represents an interface to various input device(s) 1004, such as a keyboard, mouse or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011 which may be a cathode ray tube (CRT) or a thin film transistor (TFT) display. The system 1000 may also include a printer controller 1012 for communicating with a printer 1013. A communications controller 1014 may interface with one or more communication devices 1015 which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016 which may represent more than one physical bus. However, various system components may or may not be in physical proximity to one another. For example, input data and/or output data may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

The present invention may be conveniently implemented with software. However, alternative implementations are certainly possible, including a hardware implementation or a software/hardware implementation. Any hardware-implemented functions may be realized using ASIC(s), digital signal processing circuitry, or the like. Accordingly, the "means" terms in the claims are intended to cover both software and hardware implementations. Similarly, the term "machine-readable medium" as used herein includes software, hardware having a program of instructions hardwired thereon, or a combination thereof. With these implementation alternatives in mind, it is to be understood that the figures and accompanying description provide the functional information one skilled in the art would require to write program code (i.e., software) or to fabricate circuits (i.e., hardware) to perform the processing required.

In accordance with further aspects of the invention, any of the above-described methods or steps thereof may be embodied in a program of instructions (e.g., software), which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A process for simulating a surface acoustic wave in a waveguide comprising the steps of:

analyzing an upper portion of the waveguide including an array of electrodes with a finite element method; and analyzing a lower portion of the waveguide including a bottom of the waveguide with an analytic method, comprising:

finding a first four non-trivial analytic solutions to a Christoffel equation in which an imaginary part is less than zero, and determining four additional solutions based on the first four solutions;

wherein the surface acoustic wave is simulated in the waveguide.

2. The process of claim 1, wherein a traction-free condition is enforced at a bottom of the lower portion of the waveguide.

3. The process of claim 1, wherein analyzing the upper and lower portion of the waveguide includes solving Newton's equation of motion and Gauss's Equation of charge conservation for particle displacement and electric potential.

4. The process of claim 3, wherein the particle displacement and the electric potential in the lower portion of the waveguide are approximated by a finite expansion of space harmonics.

5. The process of claim 4, wherein the finding sub-step comprises finding and using all non-trivial roots of the Christoffel equation of each space harmonic term.

6. The process of claim 1 in which the first and second four solutions are approximated by minimizing a determinate of a system of linear homogeneous equations representative of the Christoffel equation.

7. The process of claim 1, wherein a portion of the waveguide including an individual electrode is analyzed.

8. A non-transitory computer readable medium that includes instructions for performing a process of simulating a surface acoustic wave in a waveguide, the instructions comprising:
   instructions for analyzing an upper portion of the waveguide including an array of electrodes with a finite element method; and
   instructions for analyzing a lower portion of the waveguide including a bottom of the waveguide with an analytic method, further comprising:
      instructions for finding a first four non-trivial analytic solutions to a Christoffel equation in which an imaginary part is less than zero, and
      instructions for determining four additional solutions based on the first four solutions;
   wherein the surface acoustic wave is simulated in the waveguide.

* * * * *